US008319603B1

(12) United States Patent  
Bourke et al.

(10) Patent No.: US 8,319,603 B1  
(45) Date of Patent: Nov. 27, 2012

(54) KEYPAD WITH AUDIT TRAIL FOR HIGH DENSITY MOBILE SYSTEMS

(75) Inventors: Brian P. Bourke, Jefferson, WI (US); Eric J. Wipperfurth, Fort Atkinson, WI (US); Tim Wawrzynczak, Madison, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 546 days.

(21) Appl. No.: 12/396,186

(22) Filed: Mar. 2, 2009

(51) Int. Cl.  
 G05B 19/00 (2006.01)  
 G08B 23/00 (2006.01)  
 A47B 87/00 (2006.01)

(52) U.S. Cl. ...... 340/5.51; 340/5.73; 340/517; 312/201; 312/198; 312/199

(58) Field of Classification Search ............... 340/5.51, 340/5.73, 5.54, 5.85, 5.27, 5.3–5.33; 312/201; 211/1.57  
See application file for complete search history.

(56) References Cited

U.S. PATENT DOCUMENTS

| 4,733,923 | A | * | 3/1988 | Dahnert ................ 312/201 |
| 5,050,941 | A | * | 9/1991 | Dahnert et al. .......... 312/201 |
| 5,520,450 | A | * | 5/1996 | Colson et al. ........... 312/215 |
| 5,636,750 | A |   | 6/1997 | Heyl |
| 5,701,828 | A | * | 12/1997 | Benore et al. ............ 109/56 |
| 5,774,059 | A | * | 6/1998 | Henry et al. ........... 340/5.54 |
| 6,097,306 | A |   | 8/2000 | Leon et al. |
| 6,260,936 | B1 | * | 7/2001 | Frank et al. ........... 312/201 |
| 6,317,025 | B1 |   | 11/2001 | Leon et al. |
| 7,019,614 | B2 | * | 3/2006 | Lavelle et al. .......... 340/5.5 |
| 7,212,098 | B1 | * | 5/2007 | Trent et al. ............ 340/5.3 |
| 7,262,698 | B1 |   | 8/2007 | Frederick et al. |
| 2006/0232381 | A1 | * | 10/2006 | Gauthier ............ 340/5.73 |

* cited by examiner

Primary Examiner — Daniel Wu  
Assistant Examiner — Mancil Littlejohn  
(74) Attorney, Agent, or Firm — Andrus, Sceales, Starke & Sawall, LLP (57) ABSTRACT

A control device for a mobile storage system includes a data entry device, such as a numeric keypad. The user enters an access code on the keypad, and the access code is compared against a data table including a list of security levels associated with access codes. If the access code entered is included in the data table, the user is permitted to control the mobile storage system according to the access rights granted by the security level associated with the access code. Each of the access codes and attempted commands entered in the numeric keypad are recorded in an activity log. The activity log is downloadable to a computer for later review.

17 Claims, 7 Drawing Sheets

KEYPAD WITH AUDIT TRAIL FOR HIGH DENSITY MOBILE SYSTEMS

BACKGROUND OF THE INVENTION

This invention relates to a control device for a mobile storage system. More specifically, the invention relates to a control device that accepts access codes to selectively control mobile storage units according to the security level assigned to the access code entered. The control device records the access codes and commands entered into the control device.

As is known to those skilled in the art, mobile storage systems permit the efficient storage of large volumes of records or other materials. A mobile storage system includes mobile storage units, such as racks or shelving units which may be secured to a carriage having wheels and a drive mechanism, which may be moved with respect to one another, typically along a rail system. The mobile storage units may selectively be moved together or apart from each other such that an aisle is formed between selected storage units. In this manner, mobile storage units permit more storage in a given area than may be achieved within the same area using fixed storage units, which require an aisle between adjacent storage units.

Prior art powered mobile storage systems typically utilize one of two basic modes of operation. The first is a "push and hold" mode of operation. In a push and hold system, an operator "manually" moves one carriage at a time by pressing and holding a move button on a mobile storage unit until the unit reaches a desired location and then releasing the button. An alternative to the push and hold system is the "automatic" or "one touch move" system. In this type of system, an operator presses a button commanding an aisle or mobile storage unit to move and the selected aisle opens by movement of the appropriate mobile storage unit. However, a limitation of either mode of operation is that any aisle or shelf may be accessed by any user of the system.

In some mobile storage systems, it is advantageous to prevent any user of the system from having access to every aisle or shelf in the system. For example, some mobile storage systems may hold confidential records, materials of significant value, or other items that require restricted access. Therefore, it would be beneficial to provide a control device able to limit access to at least a portion of the mobile storage system. It would also be beneficial to provide a control device that records usage and access to the mobile storage system. Such a record would be a deterrent for attempts at unauthorized access and would provide a record of authorized users that accessed restricted portions of the system.

SUMMARY OF THE INVENTION

Consistent with the foregoing and in accordance with the subject matter as embodied and broadly described herein, a control device for a mobile storage system is described in suitable detail to enable one of ordinary skill in the art to make and use the invention. The control device selectively allows control of mobile storage units according to an access code entered into the controller. The control device further records the access codes and subsequent commands entered into the control device.

According to one embodiment of the invention, a control device is used on a mobile storage system. The mobile storage system has multiple storage units with at least one of the storage units movable toward and away from another of the storage units. The control device includes a data entry portion, such as a keypad or a series of membrane covered switches, on which an access code is entered. When an access code is entered, a processor in the control device executes a program that compares the access code against a data table stored in a memory device. The data table includes a list of access codes. Each access code is associated with a security level, defining a set of access rights. If the access code entered matches an access code from the data table, the processor reads the security level and the set of access rights associated with that security level from the data table. The user then enters a command to the mobile storage system and the processor determines whether that command is permitted according to the access rights previously obtained. An activity log, including each access code or command entered, is stored in the memory device. The control device may also have a display device, such as an LCD screen, for displaying the status of the storage system.

As another aspect of the invention, the control device may also include a real-time clock. The real-time clock provides time and date information. The set of access rights associated with each security level may be configured to utilize this time and date information. For example, the access rights may be configured to permit a command to be executed according to a time of day, a day of the week, or a day of the month. In addition, each of the access numbers or commands entered may receive a date and time stamp. This date and time stamp may also be recorded in the activity log.

As still another aspect of the invention, the control device may further include a key or button to command one of the mobile storage units to move either to the left or to the right. Still another key or button may be used to command the mobile storage system to stop motion. Each of the left, right, or stop keys provide a command that may be selectively enabled according to the set of access rights.

In yet another aspect of the invention, the control device may further include a data port configured to access the memory. The data port is preferably a Universal Serial Bus (USB) port. The data port allows a preconfigured access table to be uploaded into the memory of the control device, and similarly allows the activity log to be downloaded from the memory of the control device.

The invention also contemplates a method of controlling a mobile storage system having multiple storage units, in which at least one of the storage units is mobile. The method involves entering an access code on a numeric entry device. The method then compares the access code entered against a stored data table which contains at least one access code. The method further includes identifying the set of access rights associated with each access code that matches the access code entered and allowing the mobile storage system to selectively execute a command according to the set of access rights. The method stores each access code entered into an activity log.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Figure 1:
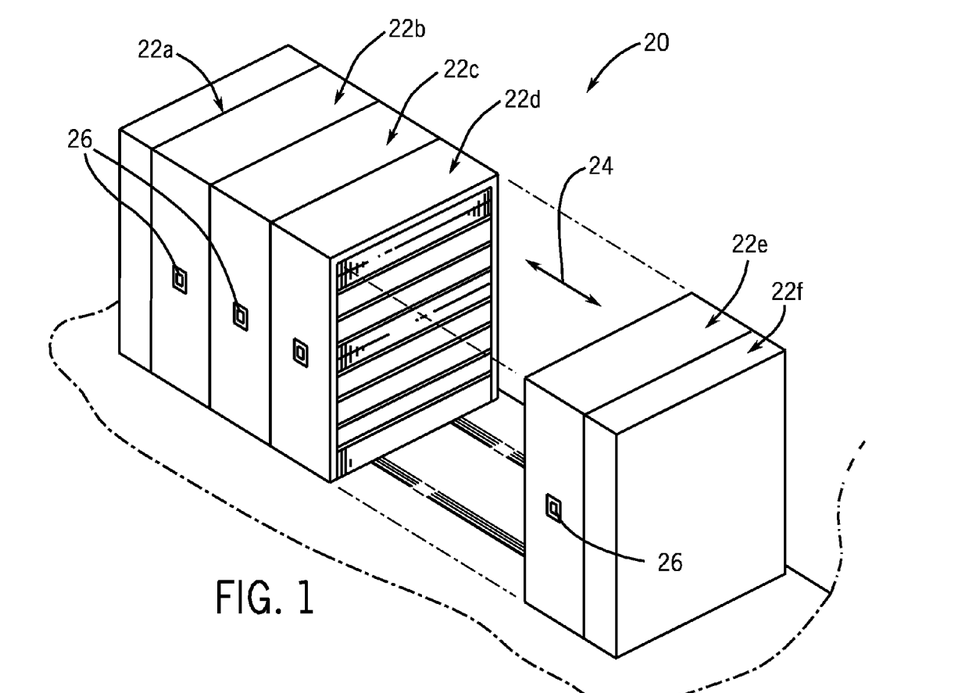
FIG. 1 is an isometric view of a mobile storage system incorporating the control device in accordance with the present invention.

Referring initially to FIG. 1, a mobile storage system 20 includes multiple storage units 22. The storage units 22 may either be stationary storage units, such as shown at 22a and 22f, or mobile storage units, such as shown at 22b-22e. The mobile storage units, 22b-22e, are movable either toward or away from each other in the direction of the arrow 24 to either open or close an aisle between adjacent storage units 22. The mobile storage units 22b-22e are operable by control devices 26 typically mounted on the side of each storage unit 22.

Figure 2:
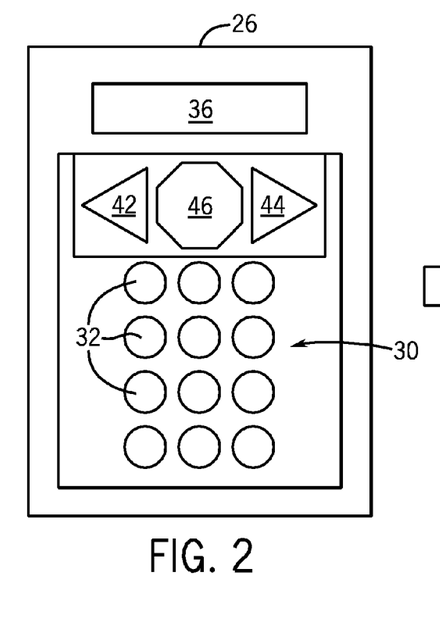
FIG. 2 is a front elevation view of one embodiment of the control device incorporated in the mobile storage system of FIG. 1.
Figure 3:
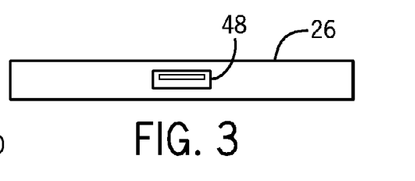
FIG. 3 is a bottom plan view of the control device of FIG. 2.

Referring to FIGS. 2 and 3, a control device 26 includes a data entry portion 30 and a display device 36. The data entry portion includes multiple keys 32 which may be in the form of a pushbutton, membrane covered switch, touch pad, or any other suitable device known in the art. Preferably, the data entry portion 30 includes a numeric keypad, including the numbers 0-9, an enter key and a clear key. Alternately, the data entry portion 30 may include any combination of letters, numbers, and function keys as required by the mobile storage system 20.

The control device 26 may further be configured to accept "push and hold" operation. An operator may move one of the mobile storage units 22 by pressing and holding a move button on the mobile storage unit until the unit reaches a desired location and the button is released. A left move 42, right move 44, and stop 46 key may be included on the control device 26 to perform the push and hold function. Although the left and right move keys 42 and 44 are depicted as separate arrow keys and the stop key 46 is depicted as a separate octagonal key, it is contemplated that these keys may be of any suitable shape or type. Alternately, the push and hold function may be implemented by assigning each of the move and stop functions as a secondary function to one of numeric keys during push and hold operation.

The control device 26 may also include a display device 36. The display device 36 may be in the form of a two-line liquid crystal display (LCD) capable of displaying system information and echoing data entered by the data entry portion 30, although it is understood that any other satisfactory display device may be employed. It is contemplated that the display device 36 may be included only on a portion of the control devices 26 and that any type of suitable display, known in the art, may be used.

The control device 26 also includes a data port 48 for transferring information between the control device 26 and another device, such as a flash memory device or a personal computer. Preferably, the data port 48 is a USB port suitable for accepting a USB cable or a USB memory device. Alternatively, the data port 48 may be any suitable device, including but not limited to, a memory card reader, a serial communication interface, and an infrared or radio frequency interface.

Figure 4:
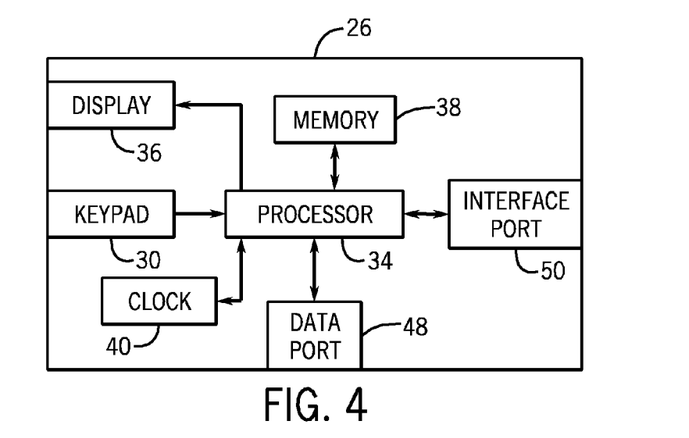
FIG. 4 is a partial block diagram representation of the control device.

Referring next to FIG. 4, the control device 26 further includes a processor 34 for executing a program, and a memory device 38. The memory device 38 is configured to store a data table containing a list of access rights and an activity log which records the data entered using the data entry portion 30. The memory device 38 may consist of a single device or multiple devices and is preferably non-volatile memory such that it retains the stored contents when power is cycled. The control device 26 further includes a clock 40. The clock 40 is preferably a real-time clock providing time of day as well as calendar information and may be any suitable device as is known in the art. The control device 26 may optionally include an additional interface port 50. The interface port 50 provides communication to other devices, such as other control devices 26 or a supervisory control system, as necessary. The interface port 50 may be any suitable interface as required by the device to which the control device 26 is connected.

Figure 5:
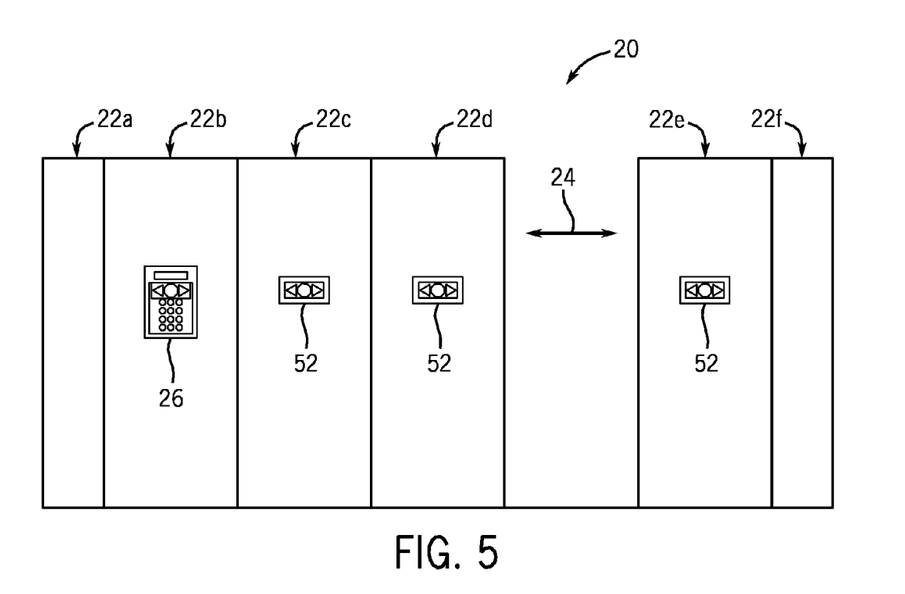
FIGS. 5-7 illustrate multiple embodiments of the mobile storage system incorporating the control device in accordance with the present invention.
Figure 6:
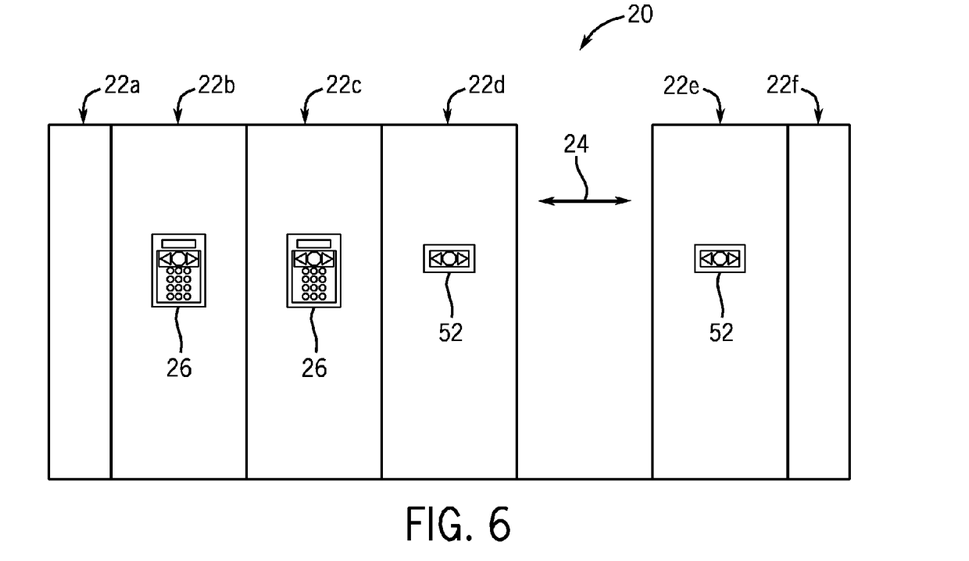
Figure 7:
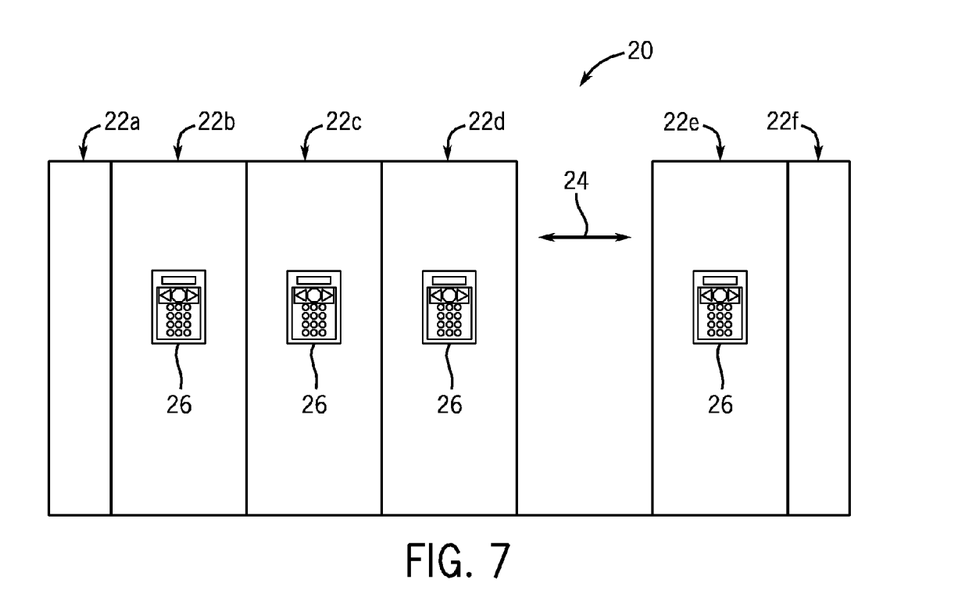

FIGS. 5-7 illustrate multiple embodiments of a mobile storage system 20 incorporating the control device 26. The control device 26 may selectively be mounted on a single, multiple, or all of the storage units 22. The other storage units 22 may either have no control device 26 or have another form of control, such as a directional control pad 52, mounted thereon. The control device 26 may be configured to control either a single or multiple storage units 22. While each of the control devices 26 are illustrated as being mounted on a mobile storage unit 22b-22e, the control device may also be mounted on a stationary storage unit 22a, 22f.

Figure 8:
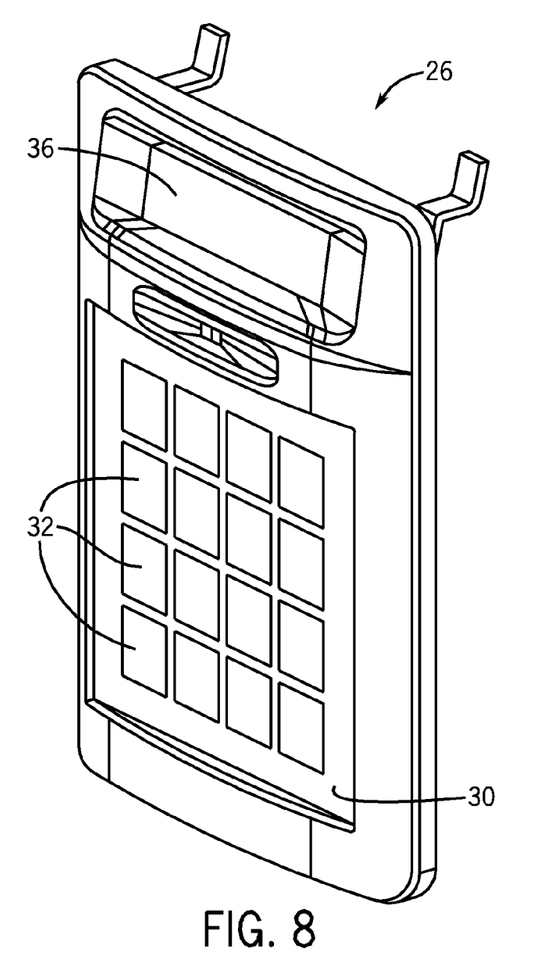
FIG. 8 is an isometric view of another embodiment of the control device in accordance with the present invention.
Figure 9:
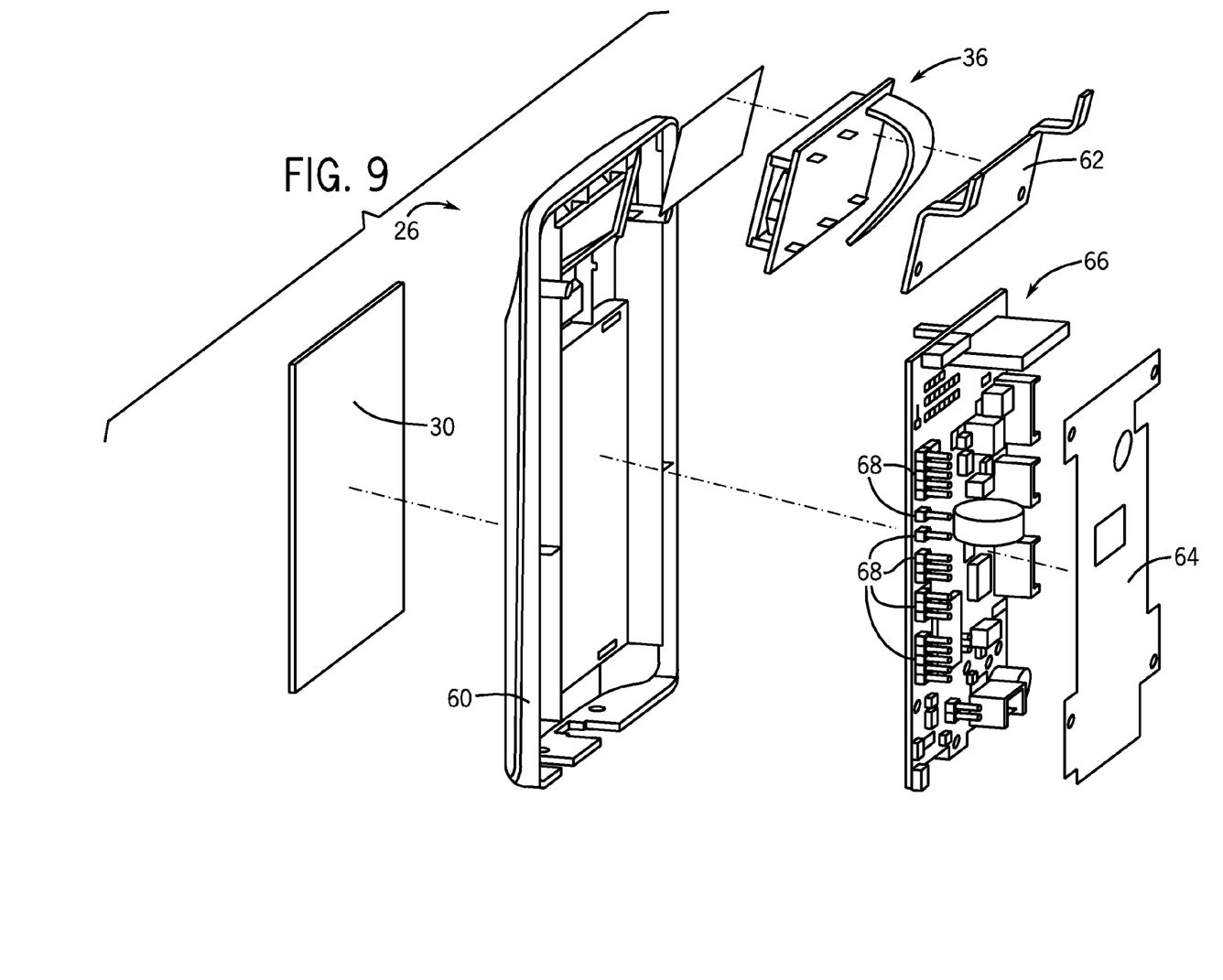
FIG. 9 is an exploded isometric view of the control device of FIG. 8.

Referring next to FIGS. 8 and 9, another embodiment of the invention is illustrated. In this embodiment, the data entry portion 30 is a touchpad 32 mounted to the front housing 60 of the control device 26. The display device 36 is mounted to the front housing 60 with a back cover 62 mounted behind the display device 36. A circuit board 66, on which the processor 34, memory 38, clock 40, data port 48, interface port 50, and configuration jumpers 68 are mounted, is contained within the front housing 60. A rear cover 64 is attached to the circuit board 66.

It should be appreciated that the housing 60, rear cover 64 and circuit board 66 is mounted directly on at least one storage unit 22 and commonly integrates the data entry portion 30, the display device 36, the real time clock 40, the memory device 38 and the processor 34 therein, such that a user of the control device 26 is enabled to enter the access code and monitor the status of the mobile storage system independent of any data entry portion or display device located remote from the storage unit 22.

A set of configuration jumpers 68 select the mode of operation for the control device 26. The control device 26 may be configured such that none, some, or all of the keys 32 require an access code to operate. For example, the control device 26 may be placed on a storage unit 22 which does not require secure access. Further, the control device 26 may only be required to command motion for the single storage unit 22 on which the control device 26 is mounted. Because no secure access is required, all of the keys may be freely accessed, such that a user may command the storage unit 22 to move by pressing the left or right move key, 42 or 44, or by using the data entry portion 30 to select the aisle adjacent to the storage unit 22 being accessed.

Alternately, the control device 26 may be mounted on a storage unit 22 which does not require secure access; however, the control device 26 may be required to permit access to aisles beyond those adjacent to the storage unit 22 on which it is mounted, some of these aisles requiring secure access. Because some secure access is required, the control device 26 may be configured such that the left or right move keys, 42 or 44, may be used without entering an access code yet require that an access code be entered when requesting access to a specific aisle.

In yet another configuration, the control device 26 may be configured to require an access code prior to allowing any command to be entered. This configuration may be required because all of the storage units 22 are secured or, alternately, to provide a log of all activity in the system 20. It is understood that many combinations of control devices 26, storage units 22, and access requirements may be selected within the scope of the present invention.

Figure 10:
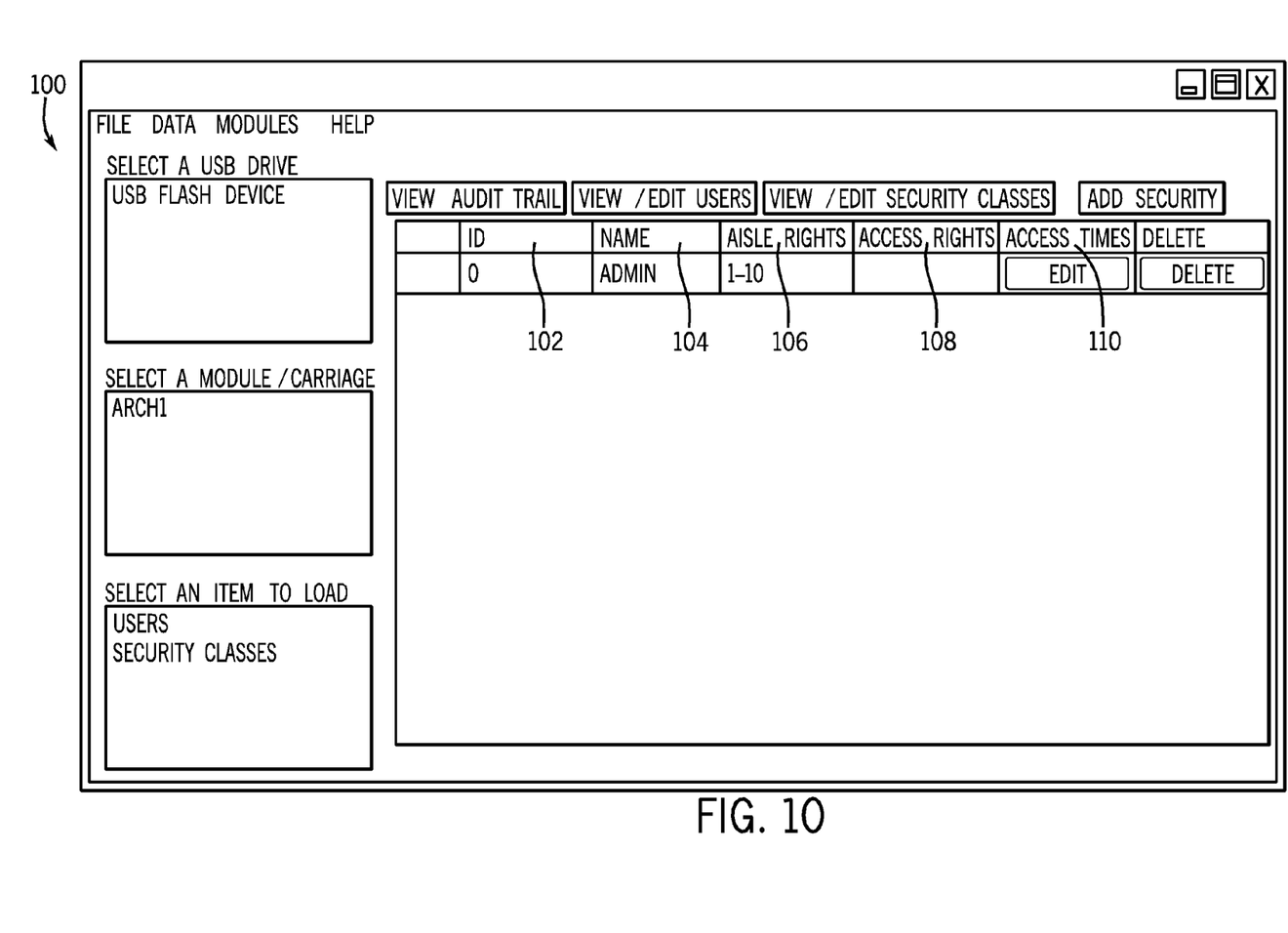
FIG. 10 is an exemplary screenshot from computer software for configuring security levels and users.

The access levels may be configured to provide many different sets of access rights or security classes. Referring to FIG. 10, the security classes may be configured using a separate program 100 executed on a computer. The set of access rights for each of the preconfigured security classes may be saved to a file. The file, in turn, may be transferred to the control device 26 using the data port 48. Preferably, the transfer occurs by downloading the file to a USB memory device and then uploading the file from the USB memory device into the control device 26. Alternately, the security classes may be configured directly on the control device 26 using the data entry portion 30, which, in turn, may require entering an access code to permit reconfiguring the control device 26.

Each of the security classes is provided with a unique identifier and a set of rights. The identifier may consist of a numerical identifier 102, an alphabetical identifier 104, or a combination thereof. Preferably, a numerical identifier 102 between zero and 255 is entered for each security class, allowing up to 256 classes to be created. The security class may include, but is not limited to, aisle rights 106, access rights 108, and access times 110. Aisle rights 106 identify which aisle, or aisles, a user may open. Any combination of aisles in the storage system 20 may be included in the aisle rights 106. Access rights 108 identify what functions a user may perform. Access rights 108 may include requesting an aisle, cycling power, commanding a mobile storage unit 22 to remain stationary, managing the access rights 108, or any custom functions as required by the storage system 20.

Access times 110 may also be assigned to each security class. The access times 110 allow unique start and stop times to be entered for each day of the week. For example, one security code may grant access to at least a portion of the storage system 20 from Monday through Friday beginning at eight o'clock in the morning through five o'clock in the evening. Another security code may grant access to at least a portion of the storage system 20 all day Saturday and Sunday. Each of the security codes would be invalid at other times of the week.

After creating security classes, a data table assigning users to each security class is created. Each user is provided an access code, such as a personal identification number (PIN), and assigned to a security class. Each access code is preferably a number up to nine digits long. The access code may also be set to automatically expire on a particular date. Alternately, access codes may be set to never expire, requiring a user to manually remove the particular access code from the control device 26. This allows both temporary and long-term security codes to be established, as needed, for users of the system 20. The data table may be configured to permit up to five hundred twelve different access codes to be recorded within the data table.

Figure 11:
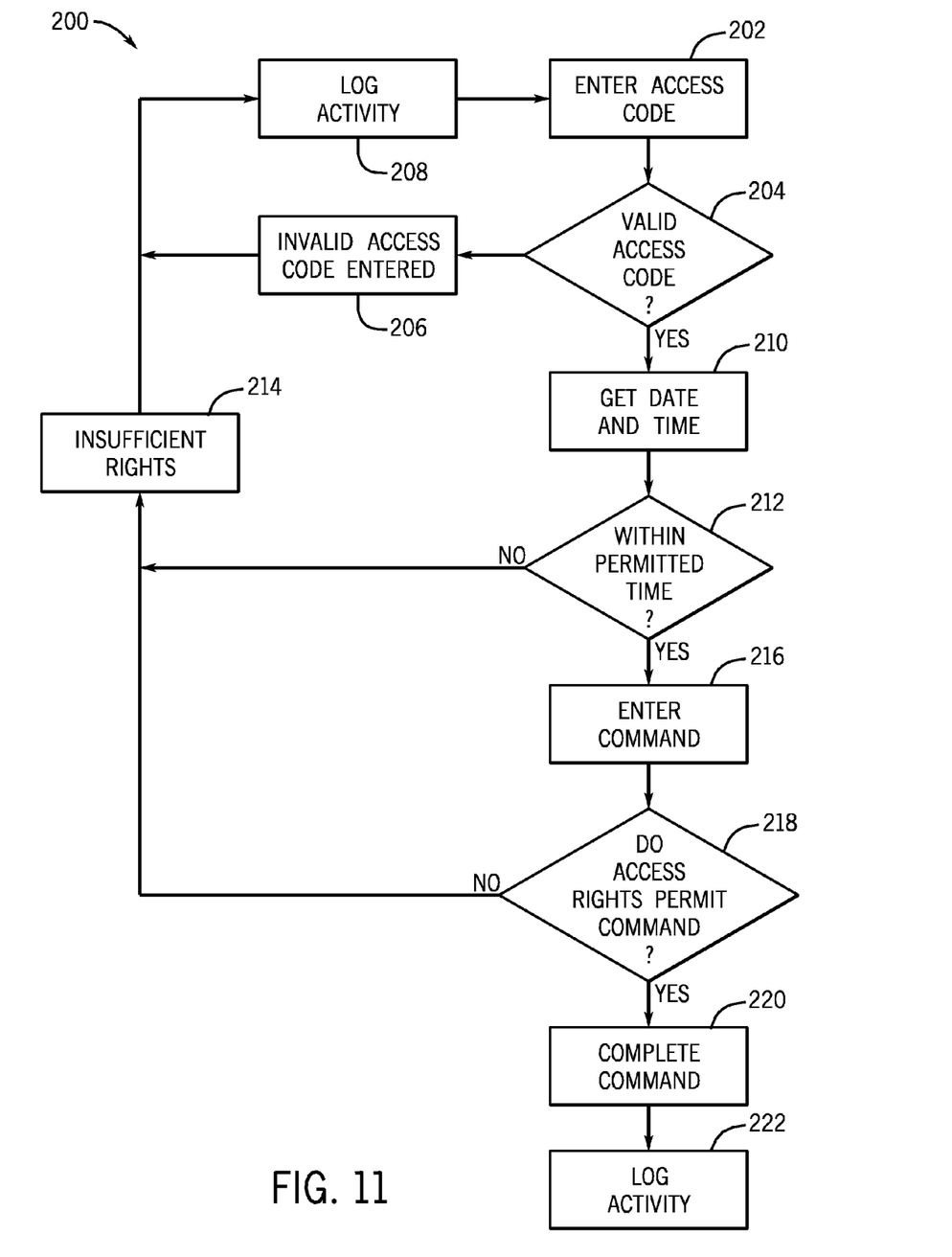
FIG. 11 is a flowchart depicting the operation of the control device.

A flowchart 200 of a sample user interaction with the control device 26, shown in FIG. 11, begins with a user entering an access code 202. The access code is compared against the data table 204. If the access code that is entered is found in the data table, then the access code entered is a valid access code. If an invalid access code is entered and the system 20 is equipped with a display device 36, a message indicating an invalid access code was entered may be displayed 206. The invalid access code, along with a time stamp indicating when the access code was entered, is stored in the activity log 208, and the system 20 waits for a new access code to be entered 202.

When a valid access code is entered, the control device 26 retrieves 210 the current date and time from the clock 40. The current date and time are compared against the access time associated with the valid access code 212. If the access code has not been entered during the access time assigned to the code and the system 20 is equipped with a display device 36, a message indicating that the access code entered has insufficient rights to control the system 20 at this time may be displayed 214. The access code and a time stamp for the access code are stored in the activity log 208, and the system 20 waits for a new access code to be entered 202.

After an access code has been validated, the user enters a desired command 216. The access rights assigned to the access code are then evaluated to determine whether the user can perform the command 218. If the command is not permitted by the access code and the system 20 is equipped with a display device 36, a message indicating that the access code entered has insufficient rights to control the system 20 at this time may be displayed 214. The access code, command, and a time stamp for each are logged in the activity table 208. The system 20 may then wait for either a new access code or a new command to be entered. If the command is permitted by the access code, the system 20 will then execute the command 220. The access code, command, and a time stamp for each are stored in the activity log 222

The activity log may be periodically reviewed to evaluate activity in the system 20. If a display device 36 is included on the control device 26, the activity log may be scrolled through on the display device. Alternately, the activity log may be downloaded using the data port 48. Preferably, the activity log is transferred by downloading the log to a USB memory device and then uploading the log from the USB memory device to a separate computer executing separate software 100. The software 100 may be used to review, store, and print the activity log.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A control device for a mobile storage system having a plurality of storage units at least one of the storage units selectively allowed to move toward and away from another of the storage units comprising:
   a data entry portion on which an access code is entered;
   a display device configured to display messages and show the status of the mobile storage system;
   a real time clock containing time and date information;
   a memory device configured to store a data table containing at least one access code associated with a set of access rights; and
   a processor executing a program wherein:
   the access code entered is compared against the access codes stored in the data table to identify whether a matching access code is present in the data table;
   the access rights associated with the matching access code are read from the memory device;
   the mobile storage units are selectively controlled to selectively permit and deny access to an aisle between one or more of the plurality of storage units according to the access rights read from the memory device; and
   an activity log stores the access code in the memory device;
   wherein a housing is mounted on the at least one of the storage units and commonly integrates the data entry portion, the display device, the real time clock, the memory device and the processor therein, such that a user of the control device is enabled to enter the access code and monitor the status of the mobile storage system independent of any data entry portion or display device located remote from the at least one of the storage units.

2. The control device of claim 1 wherein the access rights selectively control the mobile storage units according to one of a time of day, a day of a week, and a day of a month.

3. The control device of claim 1 further comprising:
   a move left key selectively commanding at least one of the mobile storage units to move to the left;
   a move right key selectively commanding at least one of the mobile storage units to move to the right; and
   a stop key selectively halting motion of at least one of the mobile storage units, each of the keys being located in the housing.

4. The control device of claim 3 wherein each of the move left key and the move right key are selectively enabled by at least one access code.

5. The control device of claim 1 further comprising a data port configured to access the memory device.

6. The control device of claim 5 wherein the data port is a Universal Serial Bus (USB) port.

7. The control device of claim 6 wherein the data table is preconfigured on a computer and transferred to the memory device using the USB port.

8. The control device of claim 6 wherein the activity log includes at least one of the entered access code; a time and date the access code was entered, a command associated with the access code, and a time and date the command was entered.

9. The control device of claim 8 wherein the activity log may be downloaded on the USB port and transferred to a computer.

10. The control device of claim 1 wherein each of the access codes is selected from a set of unique numbers and associated with one of a set of access rights wherein the set of access rights is selected from a set of unique classes.

11. In a mobile storage system having a plurality of storage units at least one of the storage units selectively allowed to move toward and away from another of the storage units comprising, a control device comprising:
    a data entry portion having input devices on which an access code is entered;
    a display device configured to display messages and show the status of the mobile storage system;
    a real time clock containing time and date information;
    a memory device configured to store a data table containing at least one access code each access code associated with a set of access rights; and
    a processor executing a program wherein:
    the access code entered is compared against the access codes stored in the data table to identify whether a matching access code is present in the data table;
    the access rights associated with the matching access code are read from the memory device;
    the mobile storage units are selectively controlled to selectively permit and deny access to an aisle between one or more of the plurality of storage units according to the access rights read from the memory device;
    an activity log stores the access code in the memory device; and
    the control device is configured such that none, some or all of the input devices require an access code to operate,
    wherein a housing is mounted on the at least one of the storage units and commonly integrates the data entry portion, the display device, the real time clock, the memory device and the processor therein such that a user of the control device is enabled to enter the access code and monitor the status of the mobile storage system independent of any data entry portion or display device located remote from the at least one of the storage units.

12. The control device of claim 11 wherein the access rights selectively control the mobile storage units according to one of a time of day, a day of a week, and a day of a month.

13. The control device of claim 11 further comprising:
    a move left key selectively commanding at least one of the mobile storage units to move to the left;
    a move right key selectively commanding at least one of the mobile storage units to move to the right; and
    a stop key selectively halting motion of at least one of the mobile storage units.

14. The control device of claim 13 wherein each of the move left key and the move right key are selectively enabled by at least one access code.

15. A method of controlling a mobile storage system having a plurality of storage units at least one of the storage units selectively allowed to move toward and away from another of the storage units, the steps comprising:
    entering an access code on a data entry portion having input devices configured such that none, some or all of the input devices require an access code to operate;

providing a memory device and a processor to compare the access code entered to a stored data table containing at least one access code;

identifying the set of access rights associated with an access code that matches the access number;

allowing the mobile storage units to be selectively controlled to selectively permit and deny access to an aisle between one or more of the plurality of storage units using a real time clock according to the access rights of the matching access code;

storing each access code entered in an activity log; and providing a display device to display messages and show the status of the mobile storage system, wherein a housing of a control device is mounted on the at least one of the storage units and commonly integrates the data entry portion, the display device, the real time clock, the memory device and the processor therein, such that a user of the control device is enabled to enter the access code and monitor the status of the mobile storage system independent of any data entry portion or display device located remote from the at least one of the storage units.

16. The method of claim 15 wherein the access rights allow the mobile storage units to be selectively controlled according to one of a time of day, a day of a week, and a day of a month.

17. The method of claim 15 wherein the access rights allow the mobile storage units to be selectively controlled by one of a move left key, a move right key, and a stop key.

* * * * *